Oct. 13, 1959     P. W. SUNDSTRÖM     2,908,078
APPARATUS FOR DRAWING PROJECTIONS
Filed Dec. 7, 1953     6 Sheets-Sheet 1
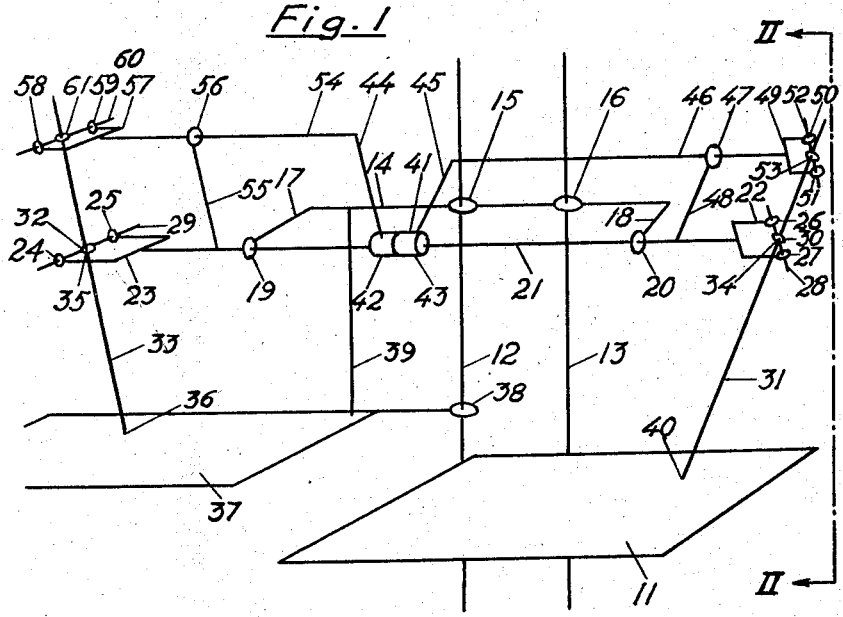
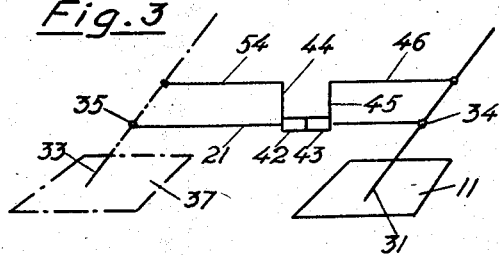
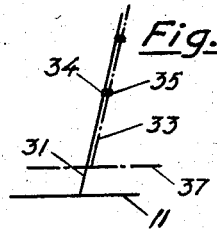
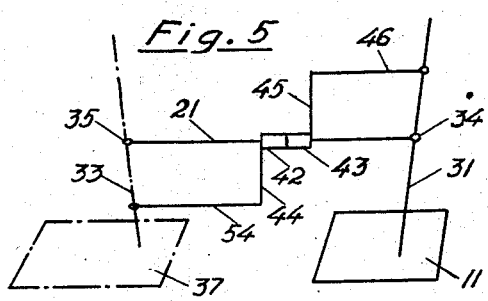
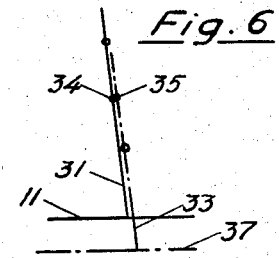
INVENTOR

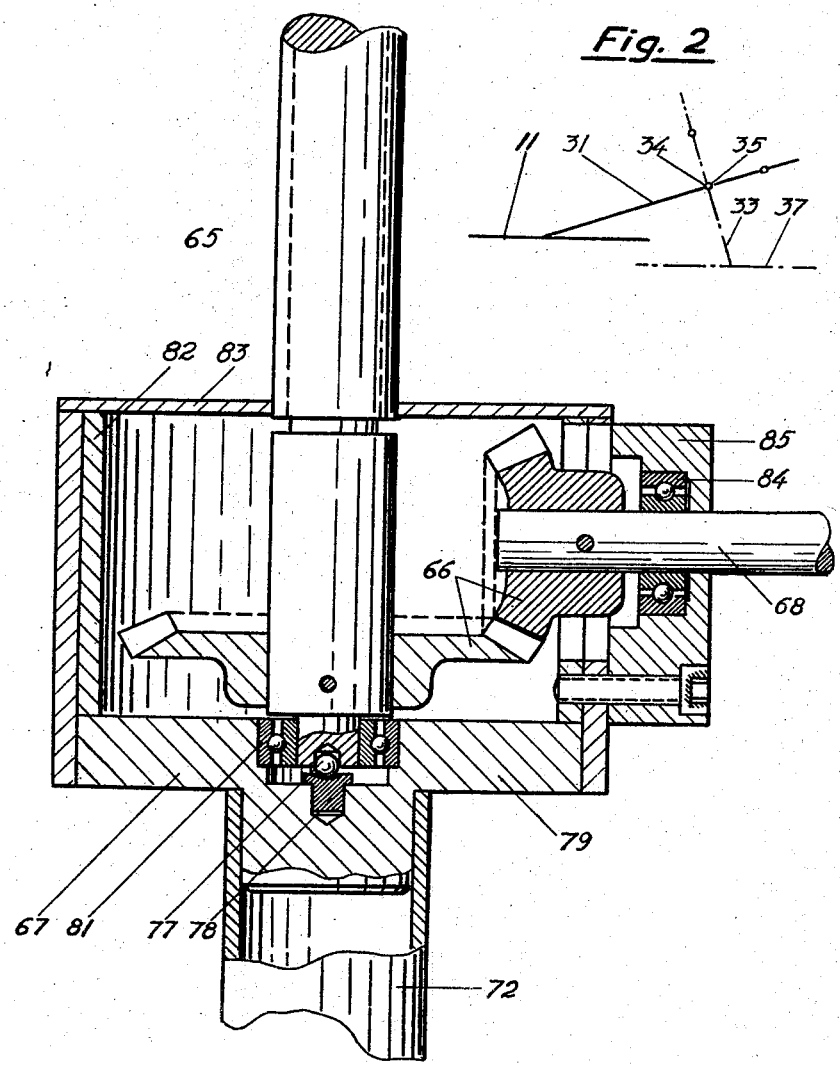

Oct. 13, 1959  P. W. SUNDSTRÖM  2,908,078
APPARATUS FOR DRAWING PROJECTIONS
Filed Dec. 7, 1953  6 Sheets-Sheet 3
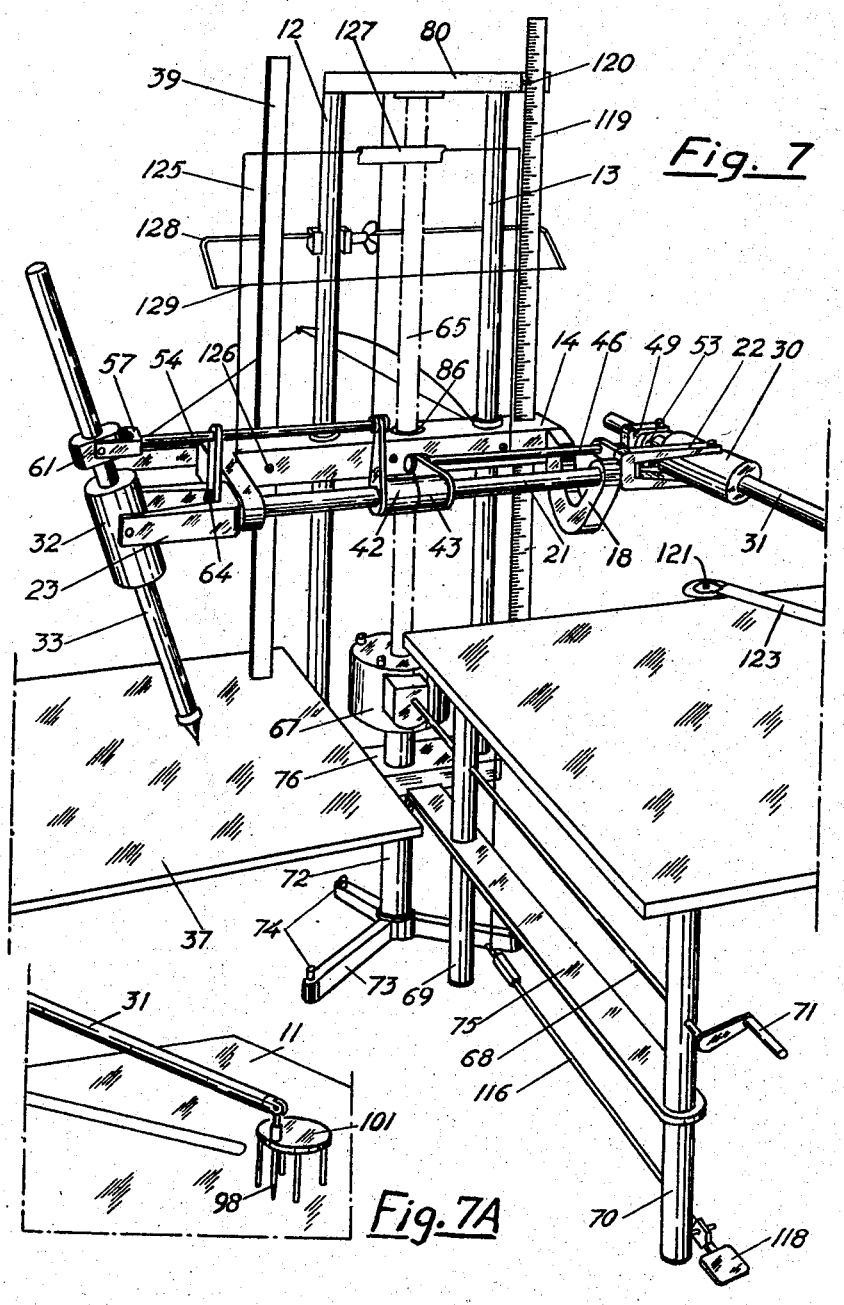

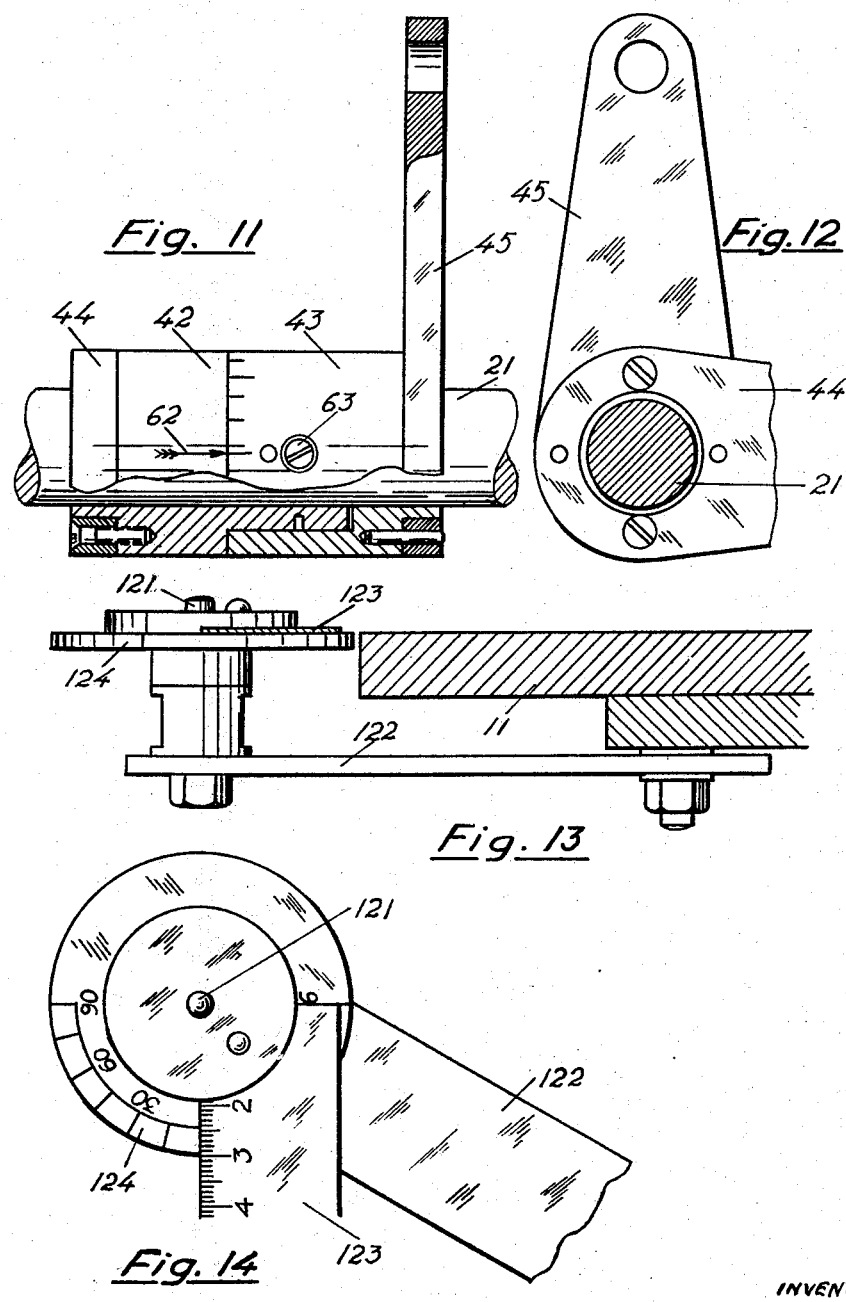

Oct. 13, 1959  P. W. SUNDSTRÖM  2,908,078
APPARATUS FOR DRAWING PROJECTIONS
Filed Dec. 7, 1953  6 Sheets—Sheet 6
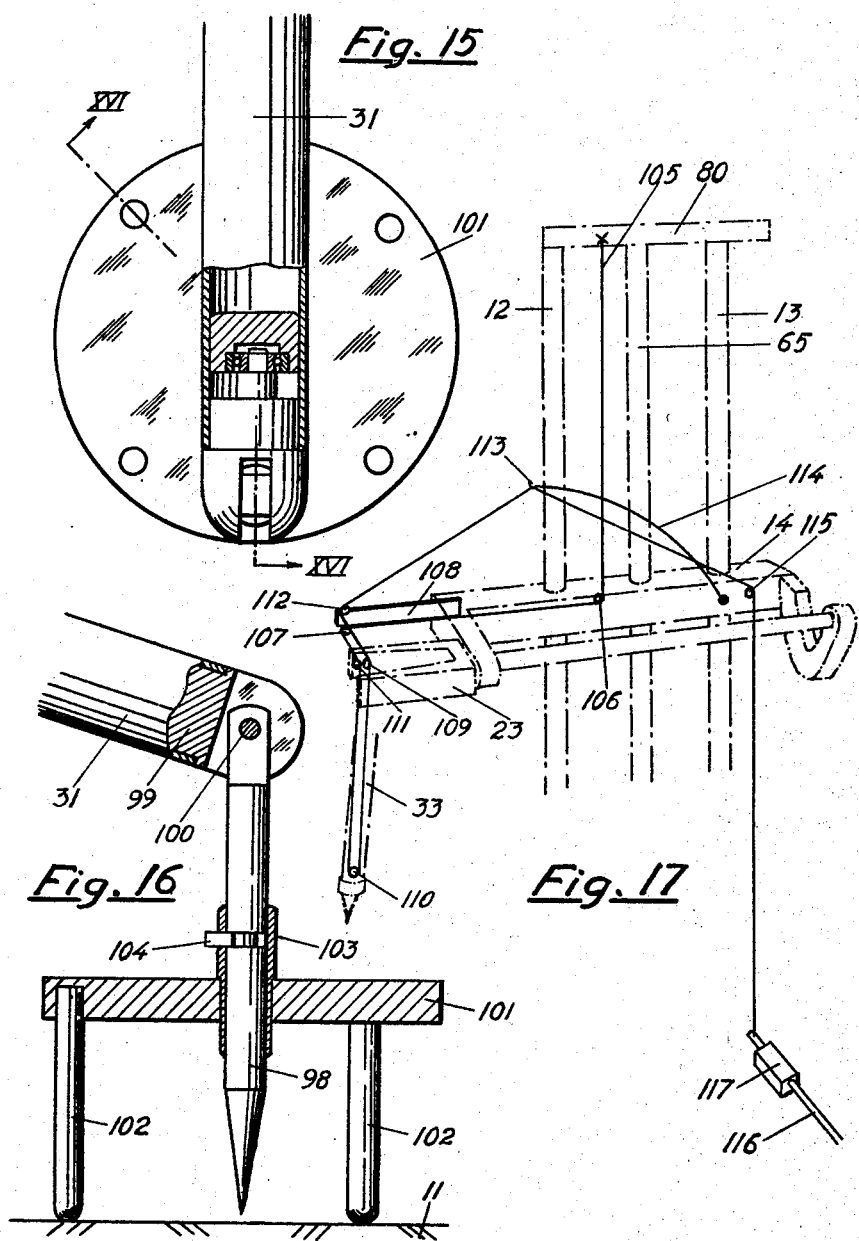
INVENTOR
Per Willehard Sundström
BY Edmund A. [signature]
his ATTORNEY

United States Patent Office 2,908,078
Patented Oct. 13, 1959

2,908,078

APPARATUS FOR DRAWING PROJECTIONS

Per Willehard Sundström, Stockholm, Sweden, assignor to Rudolf Holmdahl, Stockholm, Sweden Application December 7, 1953, Serial No. 396,384

Claims priority, application Germany July 4, 1953

9 Claims. (Cl. 33—18)

This invention relates to apparatus for drawing projections and particularly for drawing central perspective representations.

It is an object of the invention to provide improved apparatus for correctly producing a perspective view from any subject or representation.

Another object of the invention is to provide an apparatus for producing plan views from perspective views.

A further object is to provide an apparatus which can easily be modified or adjusted for many various uses.

The novel features which I believe to be characteristic of my invention are set forth with particularity in the claims. The invention, together with the above and other objects and advantages thereof, will be better understood by reference to the following description taken in connection with the accompanying drawings forming part of this specification, and of which:

Fig. 1 is a diagrammatic view showing the principle of the invention.

Fig. 2 is a view taken along the line II—II in Fig. 1.

Figs. 3 and 4 are likewise diagrams of the principle of an apparatus adjusted for enlarging pictures.

Figs. 5 and 6 are diagrams showing the adjustment of the same apparatus when it is intended for drawing reflected images.

Figs. 7 and 7a are perspective views which, when taken together, illustrate apparatus according to the invention.

Figs. 11 and 12 are details on a larger scale of the bearing sliding on the axle and connecting the two links.

Figs. 13 and 14 show details of an arrangement marking the projection in the plane of the object table of the viewing center.

Figs. 15 and 16 show a pilot pin connected to the viewing direction bar.

Fig. 17 is a perspective view of part of the apparatus and showing a means for keeping the pin lifted and inactive and making it active when desired, and Fig. 18 is a sectional view through a housing on the vertical screw for the height adjustment of the frame carrying the two centers, in which housing a gearing is arranged.

Figure 8:
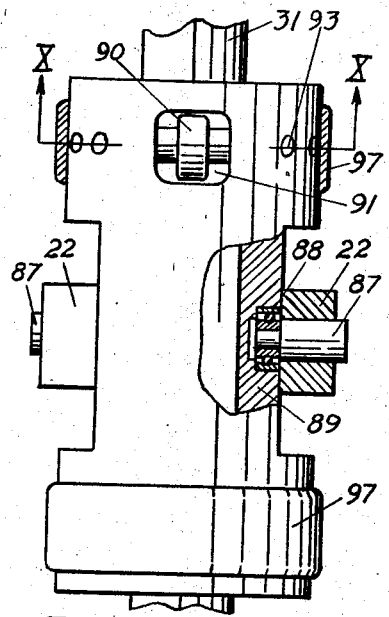
Figs. 8, 9 and 10 are details on a larger scale of the bearing arrangement in the viewing centers.

In Fig. 1 a fixed horizontal drawing board for the object is defined by a plane 11. A pair of vertical guides 12, 13 are fixedly connected in position in relation to this board or the feet thereof (not shown). A U-shaped horizontal frame 14 is movably mounted along the guides 12, 13 by bushings 15, 16. At the branches 17, 18 of the frame 14 two bearings 19, 20 are arranged, in which an axle 21 is rotatably mounted. The ends of the axle 21 carry forks 22 and 23 having bearings 24, 25 and 26, 27 in which axles 28 and 29 are rotatably mounted. The axle 28 carries a bushing 30, wherein a viewing direction bar 31 is so mounted, that it is longitudinally and angularly movable through a point which is situated in the extension of the axle 21.

The axle 29 in a similar manner carries a bearing 32, through which a drawing bar 33 is longitudinally and angularly movable in a point on the extension of the axle 21. The first moving point in the bearing 30 is called the projection center 34 of the object and the second point in the bearing 32 the projection center 35 of the picture. The distance between the points 34 and 35 is fixed.

The lower end of the drawing bar 33 is provided with a drawing means 36 which, by the movements of the viewing direction bar 31, is brought to produce a centrally projected view on a paper at the projection board 37 corresponding to the object on the board 11. The two boards are situated in parallel planes which are suitably horizontal. The horizontal projection board 37, which in the following is called picture plane is movable in the vertical direction with the aid of guiding means 38 at the guiding bar 12. The picture board 37 is further connected at an adjustable distance to the U-shaped frame 14 by a rod 39. By this arrangement it is achieved that the projection center 35 over the picture board 37 is constantly situated at the same height over this board, if desired, while the projection center 34 can be raised or lowered in relation to the subject table 11. The importance of this arrangement will appear in the following description of the manner of working of the apparatus.

Every movement of the bar 31, however, is not transmitted to the drawing means 36 by the arrangement described above. If for instance the point 40 of the bar 31 is moved in a plane passing through the axle 21 and the bar 31, only the axle 28 will be pivoted in its bearings 26, 27. In order to obtain a complete transmission of the angular movements of the bar 31 to the drawing bar 33 the apparatus is provided with special means.

On the axle 21 a sliding bearing 41 is mounted which carries two sleeves 42, 43 with arms 44, 45 fixed thereto. The arm 45 is fixed to a rod 46 which is kept parallel with the axle 21 by a bearing 47 on an arm 48 preferably perpendicular to the axle 21. In a way similar to that described in connection with the axle 21, the rod 46 carries a fork 49 with bearings 50, 51 in which an axle 52 perpendicular to the rod 48 is pivotably mounted. The axle 52 is provided with a bushing 53 so arranged that the bar 31 is axially movable therethrough and angularly movable in relation to the rod 46 at the point where the axis of the rod 46 intersects the axle 52. Due to this arrangement, the bar 31 will always pass through the center 34 which is kept fixed in space. The bar 31 may, however, be brought to any angular position. The point of intersection between the bar 31 and the rod 46 can be brought to any position on a cylinder, the axis of which is represented by the axle 21. This means that the bearing 41 will slide longitudinally and turn around the axle 21 with the arm 45 perpendicular to the axle 21 and the rod 46 making similar movements.

In order to transmit the movements of the bearing 41 to the bar 33 a similar arrangement is made in the left side of the system. To the sleeve 42 an arm 44 is connected. This arm is connected to a rod 54 parallel to the axle 21 and the same distance therefrom as the rod 46. An arm 55 is fixed to the axle 21 and provided with a bearing 56 in which the rod 54 is longitudinally movable. The rod 54 is provided with a fork 57 with bearings 58, 59 for a transverse axle 60 with a bushing 61 wherein the drawing bar 33 is axially movable. The distance from the projection of the intersection between the rod 54 and the bar 33 to the intersection between the rod 46 and the bar 31 is equal to the distance between the projection centers 34 and 35 of the object and the picture, respectively.

The head line for a perspective view is an imagined line from the eye point perpendicular to the projection plane. In pictures of architecture, if the object is not too much extended above or below the horizontal plane through the eye point, the head line is usually horizontal and directed to the center part of the object. The projection plane usually is vertical. In the case shown in Fig. 1, however, the projection plane 37 is horizontal. Therefore the plane 37 through the axle 21 and the rod 46 parallel thereto is arranged to intersect the plane through the axle 21 and the rod 54 likewise parallel thereto at an angle of 90° corresponding to the angle between the real head line and that against the projection plane of the apparatus. Under such circumstances the projection of the viewing direction bar 31 in a plane perpendicular to the axle 21 intersects the projection of the bar 33 in the same plane under an angle of 90°, as best seen in Fig. 2. One could arrange the projection plane vertically and intersecting the viewing direction in which the bar 31 moves. As this would be very impractical the plane 37 and the sight line representing means 33 have been arranged beside the object table 11 and the viewing center 34 and instead in connection with the center 35.

The planes referred to above are angularly adjustable, as best seen in Figs. 7, 11 and 12, Figs. 7 to 18 showing a practical embodiment of the invention. According to Figs. 11 and 12 the sleeves 42 and 43 slide on the axle 21. The sleeve 42 has an index 62 and the sleeve 43 an angular graduation. The sleeve 43 partly overlies the sleeve 42 and with a screw 63 the sleeves can be locked in any angular position relative to each other. The fork 22 in Fig. 7 is fixed to the axle 21 but the fork 23 is arranged to follow the sleeve 42 by the angular adjustments and is thereafter locked in position by a nut 64 on a threaded part of the axle 21.

In cases where the head line is not horizontal, as, when the object has a relatively great extension above or below the horizontal plane through the eye point, the picture plane should not be vertical. The angle between the real head line and the vertical line perpendicular to the picture plane in the apparatus has to be taken into consideration. This is made by a simple adjustment of the sleeves 42, 43 and the fork 23. The angular adjustment can also be changed for other purposes to be described hereinafter.

In Figs. 3 and 4 an adjustment of the angular relation is shown which is suitable for enlargement purposes. The links 54 and 46 are arranged in the same line. The drawing to be reproduced in another scale is placed on the object board 11 under the center 34. The scale of the reproduction depends on the relation between the height of center 35 over table 37 and the height of the center 34 over table 11.

When a reflected picture is desired the rod 33 is pulled out from the bearings 32 and 61 and inserted in the opposite direction. The sleeve 42 and the nut 64 are unlocked and the link 54 is turned to a position in which it is situated in the same plane as the axle 21 and the link 46 but on the opposite side of the axle 21 as shown in Figs. 5 and 6. When the viewing direction bar 31 is moved clockwise after locking the details in these positions in Fig. 5 the drawing bar 33 will be moved in an anti-clockwise direction. A reflected picture is thus obtained. If there is a transparent drawing face up on object table 11 a reverse view is obtained on projection or picture table 37 corresponding to this transparent drawing being sketched at the outer side and moved over to table 37, as when reading a book. By changing the heights from tables to centers different scales can be obtained. The method of obtaining reflected views can be used when part of a drawing has to be turned over.

For raising and lowering the frame 14 and thus changing the height of the projection center 34 over the object table 11, a screw 65 is arranged parallel to the guides 12, 13 and gearing 66 in a housing 67 is provided below the table 11 (Figs. 7 and 18). The gearing is actuated by a shaft 68 passing through openings in two of the legs 69, 70 of the object table 11 and having a handle or crank 71 in front of the table 11. The housing 67 rests on a pipe 72 having a foot 73 with three arms provided with adjustment screws 74. The table 11 is detachably connected to other parts of the apparatus by a connecting member 75 and screws under the lower horizontal end part 76 for the guides 12, 13.

The screw 65 is mounted between two balls 77 resting on a spherical surface in a ball holder 78 inserted in the bottom 79 of the housing 67 and the upper horizontal end member 80 for the guides 12, 13. At each end of the screw 65 a radial thrust bearing also is arranged. The housing further comprises a cylindrical, vertical wall 82 and a cover 83. The shaft 68 has a bearing 84 in a member 85 attached to the housing 67. A threaded member 86 is fixed to the frame 14 and thus the frame 14 is moved in one direction or the other when the handle 71 is actuated clockwise or in the opposite direction.

In order to allow the viewing direction bar 31 to be moved also in a horizontal position the arm 18 of the frame 14 has a curved shape.

Figure 9:
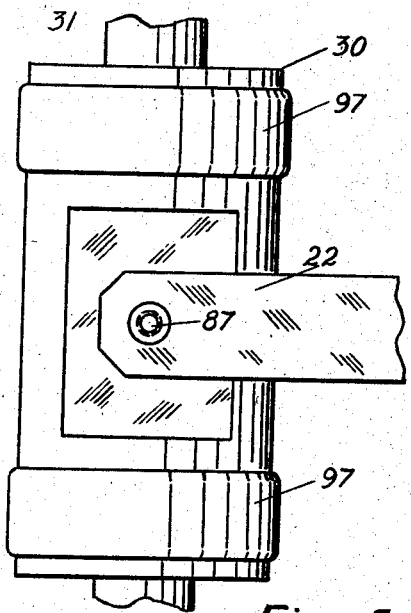
Figure 10:
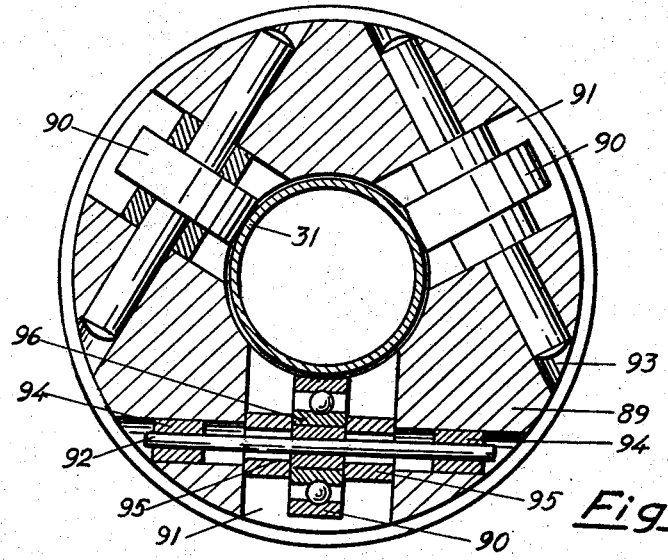

Some details of the bearing arrangement for the viewing direction bar 31 and the drawing bar 33 are shown in Figs. 8, 9 and 10.

At the ends of the fork 22 two pins 87 with bearings 88 are arranged on which the bearing body 89 is pivotal in a plane. The bar 31 is kept in a very definite position in the body 89 by two sets of ball bearings, one of which is shown in detail in Fig. 10. In a plane perpendicular to the bar 31 three ball bearings 90 are inserted through openings 91 in the body 89 and carried on axles 92 inserted through smaller openings 93 and positioned by distance rings 94, 95 and 96. The openings 91 and 93 are covered by dust protecting rings 97.

The guiding arrangement for the bar 31 is of a nature which makes the bar 31 movable essentially only in the longitudinal direction. The bearings 53 and 61 are of a similar construction having, however, only one set of ball bearings. In order to make it possible to keep the point of the bar 31 directed to the object without changing the grip thereon when the bar is moved, the bar can be provided with a point member which can be turned within the bar 31 which is in the form of a pipe.

In many cases when the object is represented by a horizontal section and the bar 31 is to be moved very near the corresponding horizontal plane, it would be very inconvenient to work with the bar 31 in the form hitherto described. Instead a pilot pin 98 is used which is connected to the point of the bar 31 and so arranged that it can be constantly kept perpendicular to the table 11. This arrangement is shown in Figs. 7A, 15 and 16. In the end of the bar 31 a plug 99 is arranged to be turned around. This plug is connected to the pilot pin 98 by an axle 100. In this way the pilot pin 98 can be moved into every position with relation to the bar 31. The point of intersection between the center lines for the bar 31 and the pin 98 is the point which determines the viewing direction from the projection center 34. This point is constantly moved in a plane parallel to the table 11 and thus the real section is reproduced as seen from the center 34 and situated on this higher level. The pin 98 is kept perpendicular to the table 11 by a preferably transparent plate 101 with four legs 102. To keep the pin 98 slightly above the table in order not to tear a paper thereon, it is connected to the plate 101 by a sleeve 103 and preferably a snap acting member 104. When for instance right angle lines on the table 11 are to be reproduced this can be facilitated if a rule can be used for guiding the pin 98. For that reason the pilot pin 98 is arranged very near the margin of the plate 101.

The drawing bar 33 is provided with an arrangement to counteract the weight thereof and keep the drawing means out of contact with the table 37 or a paper placed thereon. This arrangement is shown in Figs. 7 and 17. In Fig. 17 part of the machine is shown in dotted lines. A wire 105 is attached to the upper frame member 80 and passes in a vertical direction down to a roller 106 journalled on a screw on the rear side of the frame 14. From the roller 106 the wire extends to another roller 107 on an auxiliary arm 108 attached to or forming part of the frame 14 and to a roller 111 on the rear arm of the fork 23 and down to a roller 110 near the drawing means of the bar 33. The wire then goes up to a second roller 109 which is rotatable on the same axle as the roller 111. This axle, not shown in the drawing, is arranged in a pivotal member attached to the fork 23. Hence, the wire may change direction when the bar 33 is moved, without leaving the rollers 109 and 111. From the roller 111 the wire passes to a second roller 112 at the end of the auxiliary arm 108, through a hook 113 at the free end of a spring 114, the other end of which is attached to the frame 14. Further, the wire passes over a second roller 115 on the frame 14 and vertically downward to a controlling member 116 which is shown in the form of a lever in Fig. 7. This lever carries a counterweight 117, a pedal 118 and is pivoted at one front leg 70 of the object table 11. Only when the pedal 118 is depressed the drawing means will be active during the movements of the drawing bar 33.

In Fig. 7 a vertical graduated rule 119 is shown at the right side of the two vertical guides 12, 13. This rule 119 is attached to the frame 14 and the upper frame member 80 has an index 120 so that the relative heights of the frame 14 in different positions can be controlled.

The center 34 corresponds to an eye point from which the object is seen. The head line corresponds to the optical axis in a camera, the lens system of which is situated at the eye point. The film in the camera is perpendicular to the optical axis and corresponds to a paper on table 37. In order to be able to locate an object drawing so that the desired perspective view is obtained it is necessary to know or to decide the height of the camera over the ground, the distance from object to camera and the angular direction. If the object is represented in the form of a plane, as a horizontal section of a house, it is possible to decide that the camera shall be located say 20 meters from the face of the house, 5 meters over the section plane and in a direction from a point which can be marked at the drawing. From this point an auxiliary line is suitably drawn through the center part of the house.

If it is desired to make a drawing corresponding to a photograph taken from the point mentioned above, the sectional drawing is positioned on the table 11 so that the auxiliary line intersects a point right under the center 34, this point being marked by a member 121 which is a projection on the plane of the table 11 of the eye point 34, as best shown in Figs. 7, 13 and 14. This member 121 might have the form of a short pin projecting from an arm 122 under the table, which normally is located in front of that point seen from the operator. The arm 122 can be moved aside, when the table is to be pushed in under the center 34 for other purposes as enlargement work. A graduated rule 123 is arranged to be pivotally mounted on the pin 121 so that the graduated side gives the distance from the projected point. To the pin 121 a plate with an angular scale 124 is attached below the graduated rule 123.

The rule 123 is laid over the section and this is moved to or from the point 121 so that the desired distance is obtained. After that only the height of the center 34 has to be adjusted. This height can be measured by hand or on the vertical graduated rule 119 along the guides 12, 13.

A vertical plate 125 (which is suitably transparent) is attached to the frame 14 by three screws 126 visible in Fig. 7. At the upper edge of the plate 125 a paper holder 127 is shown. At the rear side of the guide 12 a U-shaped frame 128 is adjustably attached, the legs of which are connected by a thread 129 in front of the plate 125. A drawing presenting details in vertical positions can be attached to the plate behind the thread.

If a body as a cube is to be reproduced, different methods can be used. First the square on the object table could be reproduced which will result in a view of the bottom plane. Thereafter the object table is raised so that the square on the object table will be situated in the upper plane of the cube nad once more the square is reproduced which will result in a view of the upper plane of the cube.

Of course one can reproduce the planes in the opposite order and lower the table between the operations of drawing. The respective corner points in the picture then can be connected by right angle lines drawn by hand. Such vertical lines on the object can also be obtained by having the pen rest on the picture table and keeping the pilot pin 98 at a corner point of the object during the change of height of the table 11 in relation to the projection center 34. Since a movable working table is inconvenient, the arrangement in the preferred embodiment shown is such that the working table can be fixed.

One can obtain the same result by instead making the projection center 34 adjustable vertically and permitting the picture table 37 to accompany the center 35 in this movement. Then one can suitably begin with the reproduction of the bottom plane of the cube, thereafter lowering the frame 14 with the projection center 34 and the picture table 37 as much as the height of the cube in the desired scale before drawing the upper plane.

It appears from the above that a body can be drawn in perspective with the aid of a number of orthogonal projections of parallel sections through the body. Of course it is possible to make perspective sections of the body in the same manner. It is only necessary to know the perpendicular distance between these sectional planes in order to take this into consideration when changing the height of the center 34 over the object table 11.

When planes situated below the horizon line are to be reproduced the center 34 is raised. When on the contrary planes over the same line are to be reproduced the center 34 is to be lowered so that the viewing direction bar 31 is inclined up to the object. This is possible owing to the pilot pin 98 being pivoted to the bar 31.

If one wishes to reproduce, for example, the faces or side of a house, it is possible to arrange the plane plate 125 perpendicular to the object table 11 and along one front bottom line. On this plate 125 an orthogonal projection of the face or faces is attached. When one after a suitable adjustment of the center 34 follows the lines in the object picture on object table 11 which have to be reproduced in the perspective view with a point which may be attached to the bar 31 instead of the fork plug 99, the desired view is automatically obtained on the picture table. Of course the object representation can instead be attached to a wall or the like in front of or behind the object table 11.

It is also possible to place an elevation view flat on the object table 11 and to keep the eye point 34 in the same angular relation to such view, whereafter the drawing bar 33 is adjusted perpendicularly to the picture table 37. This means that the center 34 is first adjusted to a position comprising the real eye point and the bar 31 is kept in line with the real head line during the adjustment of the bar 33 to the angular relation which has to be used when making the reproduction.

In such elevation view the real horizon plane is vertical and intersects the object table 11 along a line which before designated the projection of the head line on the object table 11. The vertical projection or elevational view of the object is placed on the object table 11 in such a position that the direction of the head line in this projection even now coincides with the head line marked on the table.

In another very suitable way of drawing houses in perspective views a horizontal section of the house is used and attached to the object table 11 in a suitable position. A front view of a face of the house is attached to the vertical plate 125 connected to the frame 14 in a vertical and upright position behind the indicating, horizontal thread 129. The holder 128 for this thread is then lowered or raised along the guide 12 so that the thread coincides with a horizontal line corresponding to the plane of the horizontal section on the table 11 when the center 34 is positioned at the point from which the perspective view is to be seen.

Details of the horizontal section which are to be seen in the perspective view are drawn. Then the center 34 is lowered before details of the face, as a window, for example, is drawn. The position of the window corners can be marked on the line in the horizontal section which corresponds to a vertical projection of the window.

In order to move the pilot pin 98 from the horizontal section to a corner point the pilot pin is kept at a marked point in the plan view on object table 11 and the frame 14 with the center 34 is lowered until the thread 129 coincides with the lower line of the window in the elevation view. Now the pilot pin 98 can be moved along the line to the other marked corner point with the pen in action.

If the center 34 is lowered further until the thread coincides with the upper window line and the pen is in action, a vertical window line is reproduced on the table 37. The pilot pin 98 is now moved back to the first marked point on the table 11 and then the center 34 is raised the height of the window on the elevation view. During the last mentioned movement a vertical window line from an upper to a lower corner is being reproduced.

With the center 34 in a suitable position all horizontal lines in one horizontal object plane can be drawn when the thread 129 on plate 125 is positioned at the desired vertical height on the elevation view mounted on the plate. Vertical lines can be reproduced as indicated above or drawn by hand between the end points dotted or marked off by the machine.

Straight lines which are not horizontal or vertical in the object can be completed correctly if only two points thereon are obtained by the machine. Otherwise, corresponding sections or plan views can be used on the object table as described above.

If different horizontal sections in the same house differ from each other, of course these different sections have to be placed on the object table and reproduced whereby the different sections have to be positioned correctly in relation to each other.

Pictures of double-curved surfaces can be drawn when a sufficient number of sections close to each other are reproduced and thereafter the perspective picture is completed by drawing the contour lines which are tangential to the sections or by connecting the points which form limiting lines of the surface.

When the extension of the object in the vertical direction over the horizontal plane through the head point is so great that the rear edge of the object table prevents a sufficient lowering of the center 34, an inverted section can be made in the machine. The bar 33 is pulled out of the centers 35 and 61 and the center 35 and the link 54 turned 180°. This change has to be made because the horizontal projection is still positioned as before. If the drawing is transparent it is only necessary to turn it upside down on the table. Then the bar 33 is again inserted so that the pen points to the table. After a suitable adjustment of the height of the center 34 the view can easily be drawn in the form of a reflected picture. It is to be observed that positive heights in relation to the ground plane now are turned negative. Hitherto it has been assumed, that the head line is horizontal.

Theoretically, when the extension of the object above or below the horizontal plane through the horizon line, which may be at the height of the view point 34, for example, is so great that the angle of view at the view point will be too great it is possible to incline the head line. (The angle of view is twice the angle comprising the original head line and a line to the angularly most distant point of the object.) In this instance the center 34 is raised or lowered until the bar 31 with the point at the table reaches the inclination corresponding to the desired inclination of the head line, whereafter an adjustment is made of the pen 33 so that it is vertical. Lines which are vertical in the object now will converge to a point in a vertical plane through the head line above or below the horizon. The fact that the views are geometrically correct perspective views or central projections and can be drawn very fast makes it possible to produce stereoscopic views. This is accomplished by making two perspective views of the same object from two view points situated close to each other and then viewing them so that a person sees only one view with his left eye and the other view with his right eye. These possibilities open unexpected perspectives in connection with the production of motion pictures with designed images. When making three dimensional pictures it is possible to begin with the two dimensional view. The rod 31 and the bar 33 are adjusted to an angle of about 5° seen in the direction of the axle 21. The rod 54 is moved while the rod 46 remains in a fixed position so that the angle between the arms 44 and 45 is changed from 90° to 270°. With this adjustment, the second perspective view produced by bar 33 is made as seen from the first eye but in a direction parallel to the head line for the second eye. The distance from the object table 11 to the center 34 should be the same as the distance from the table 37 to the center 35. The first object view is placed on the object table 11 with the longitudinal direction of the film in the longitudinal direction of the table and at such a distance from the ground point that a vertical line through the center 34 intersects the angle between the rod and the bar in two equal parts, when the rod 33 is directed to the center of the second view.

When drawing the first picture one assumes that different details are located at different distances from the viewer. These distances should be known but they can be determined by the relationship to the size of some known details. The drawing suitably begins with the most distant details and the center 34 is then successively lowered proportional to the distance from the viewer. It should be observed that the distance from the center 35 to the table 37 should be lowered equally to the center 34. Such change is most easily obtained if a plate is arranged in the same plane as the object table 11 and below the center 35.

By following a circle line on the object table it is possible by different combinations of the height of the projection center 34, the dimensions of the circle on the table 11, the distance between center 35 and the table 37, and different initial angles between the pilot rod 31 and the pencil 33 directly to obtain ellipses, parabolas and hyperbolas of desired form. The circle center at the object table 11 should be situated vertically under the center 34. If the pilot point follows this circle the bar 31 will move in a path defining the surface of a conical body. The pen 33 will move in a path defining a similar surface. If the axis of this last mentioned conical surface is inclined, the intersection between this surface and the projection plane or picture table 37 can be arranged to represent any of the conical sections. In order to obtain a more steady circular movement of the pilot pin a center point can be arranged on the table so that the pilot pin can be moved around this center point at an adjustable distance. This movement may be guided by a gear transmission (not shown) from the handle 71 which is arranged under the object table 11 for adjustment of the height of the frame 14. If thus the movement simultaneously raises the eye point and drives the pilot pin 98 in the circle, a perspective view of a spiral is obtained. The pitch thereof can be changed by simultaneously changing the size of the circle on the object table 11 and the distance from the projection centers 34 and 35 respectively to the picture table 37 or to the object table 11 or to both tables. It is also possible for this purpose to provide a device for producing a variable ratio of revolutions of the handle 71 with respect to the pilot pin 98 when describing a circle. Also, the angular relation between the bar 31 and the pen 33 can be used to produce the different conical sections referred to above.

If the picture table 37 were movable in a transverse direction and such movement were coordinated with the rotation of the handle 71, it will be possible to draw sine curves, such as the orthogonal projections of screws, for example.

In order to be able to make orthogonal projections from photographs of objects or to make a map from a photograph of a landscape, it is necessary to know some data. In the first case the angle between the optical axis of the camera to the plane of the house and also the perpendicular distance from the camera to such a plane in which an orthogonal projection is desired, must be known. Further, the actual distance between two clearly visible details in the photo must be known in order to establish a control for the scale of the required drawing.

The photograph is placed on the object table 11 with the center point thereof vertically under the center 34 if the optical axis of the camera was horizontal at the time of exposure, so that the center point of the view is directed to the operator. The rod 31 and the bar 33 are then adjusted to the given angle referred to above. The center 34 is then adjusted to a height equal to the focal distance $f$ of the camera. If the photograph is of a small size it is enlarged and the height of the center 34 is increased proportionally to the scale of the enlargement. The distance from center 35 to the picture table 37 is adjusted in the scale of the desired projection to be equal to the distance from the camera to the reproduced plane. The scale is controlled in the following manner. The point of the pilot pin 98 is moved over the known distance. The line $s$ in the view at the picture table 37, which is the projection of the known distance, is measured. This line, by reason of the scale selected, should be of the length $s_1$. In order to obtain the right scale on the projection or picture table 37, the distance from the center 35 to the table 37 is multiplied by $$\frac{s_1}{s}$$

and the new height is adjusted.

Maps can be made from aerial photographs with respect to known elevations on the ground.

When using aerial photographs it is necessary to know the nadir distance, subtended by the angle between the vertical line through the camera and the optical axis of the lens.

The photograph is placed on the object table 11 with the center point of the picture vertically under the center 34, so that the nadir is directed from the operator. The rod 31 and the bar 33 are angularly adjusted so that the angle defining the nadir distance. The center 34 is vertically adjusted to a height corresponding to the focal distance $f$ of the camera. The height of the center 35 above the projection table 37 is adjusted to the approximate height of the airplane in the scale of the desired map.

In order to obtain a certain scale on the projection table 37 it is necessary to know the actual distance A between two identifiable points in the photograph. The distance $a$ in the photo is measured. Then the scale of the photograph is $$\frac{a}{A}$$

If the desired scale on the projection table 37 is called $b$, the distance to be adjusted between the projection table 37 and the center 35 is $$\frac{b.f.a}{A}$$

$f$ being the focal distance of the camera. As, however, the scale of the photograph is not quite the same throughout the picture a readjustment as described above might be necessary.

When now the point of the pilot pin 98 is moved along the lines of the photograph a map in an even scale is obtained on the projection table 37. This method, however, is only to be used when making maps over an even landscape, sea shores and the like.

As the aerial photograph is a perspective view, heights are radially displaced from the center of the picture. This displacement becomes greater with increase in height and increase in distance from the center of the photograph. If, however, the differences between the levels are known, it is possible by a vertical adjustment of the center 35 in relation to the height in the scale of the photograph to make a correct map also of an uneven landscape. As it is not so easy to adjust the center 35 over the projection table 37 as it is to adjust the center 34 over the object table 11 it is possible to place the photograph on the projection table 37 and arrange a drawing means at the bar 31. Then the center 34 is adjusted to correspond to the different heights and the map can be drawn on the table 11. By interpolation of heights in parts between known heights, approximately correct situations also for points in these parts can be obtained.

When using photos taken from points on the ground the optical axis is either horizontal or slightly declined. The method to be used is the same as in the case of aerial views. The rod 31 and the bar 33 are adjusted to an angle equal to the angle between the vertical line and the optical axis.

Aerial views are often used as maps for purposes of recognition. From these, however, no indication of the height relations of the landscape are obtained. With the apparatus according to the invention, it is possible to transmit contour lines from a map to a photograph in such a way that the contours are situated in the correct position relative to the details of the view even if these contours due to perspective distortion are somewhat displaced.

Firstly the scale of the picture is decided and the rod 31 and the bar 33 adjusted to an angle defining the nadir distance. The distance from the center 35 to the projection table 37 is adjusted to the focal distance of the camera. The photograph is placed on the projection table 37 with the center of the picture vertically under the center 35 and with the nadir distance directed perpendicularly to the rear edge of the projection table 37. The distance between the center 34 and the object table 11 is adjusted relative to the distance from the center 35 to the projection table 37 to correspond to the relation between the scale of the map and that of the photograph. Then the map is placed on the table 11 so that when the point of the pilot pin 98 is placed on a point of the map, the drawing means of the bar 33 is directed to the same point in the picture. The map can now be turned around this point so that the point of the bar 31 and that of the rod 33 are directed to the same point in the different representations.

Now the map and the photograph are oriented to each other. A readjustment as described above might, however, be necessary. It should be observed, that the center 34 for every detail has to be vertically adjusted in relation to the real height difference in the scale of the map.

When the height increases, the center 34 is lowered. After the orientation has been made, the center 34 is suitably raised to the position corresponding to the lowermost contour line on the map and this line is followed by the point of the pilot pin 98. Then the frame 14 is lowered for the drawing of the next contour line and so on.

Although I have shown and described a particular embodiment of my invention, it will be obvious to those skilled in the art that various changes and modifications may be made without departing from the spirit and scope of the invention, as pointed out in the following claims.

What is claimed is:

1. Apparatus for making a perspective drawing of an object comprising projection center structure providing primary and secondary projection centers which are spaced apart and in fixed relation with respect to one another, means providing a first horizontal surface upon which plan view data of the object is adapted to be placed, first movable structure mounted for universal movement about said primary projection center, said first movable structure including contour following means for following the contour of a plan view of the object on said first horizontal surface, means providing a second horizontal surface upon which the perspective drawing is adapted to be made, second movable structure mounted for universal movement about said secondary projection center, means for transmitting movement from said first to said second movable structure, said second movable structure including point marking means for marking off at said second horizontal surface points whose positions are determined responsive to movement of said second movable structure, a plane parallel to said first horizontal surface and passing through said primary projection center also passing through said secondary projection center, and means for moving said first horizontal surface and said projection center structure relative to one another to vary the perpendicular distance between said first horizontal surface and the plane parallel thereto which passes through both of said projection centers, said first and second movable structures being so angularly displaced with respect to one another that a plane passing through said contour following means and through the axis through both of said projection centers will be angularly displaced with respect to a plane passing through said point marking means and through the axis through both of said projection centers.

2. Apparatus as set forth in claim 1 in which said means for transmitting movement from said first movable structure to said second movable structure includes provisions for adjusting angular positions of said first and second movable structures with respect to one another about the axis passing through both of said projection centers.

3. Apparatus as set forth in claim 1 which includes means for adjusting the angular positions of said first and second movable structures with respect to one another about the axis passing through both of said projection centers.

4. Apparatus as set forth in claim 1 in which said first horizontal surface is readily accessible at the front of the apparatus and a vertical line passing through said primary projection center is nearer to the rear edge than to the forward edge of said first horizontal surface.

5. Apparatus as set forth in claim 4 including a measuring rule overlying said first horizontal surface, and means for mounting said rule for pivotal movement about an axis below said primary projection center and through which the vertical line passes.

6. Apparatus as set forth in claim 1 which includes means for holding an elevation view of an object, indicating means cooperating with said holding means, said means for moving said first horizontal surface and said projection center structure relative to one another also effecting movement of said holding means and said indicating means relative to one another.

7. Apparatus as set forth in claim comprising means including a vertically movable member for carrying said projection center structure, said means for moving said first horizontal surface and said projection center structure relative to one another comprising mechanism for moving said vertically movable member, vertically disposed means for holding an elevation view of the object in an upright position, said last-mentioned means being carried by said member and movable vertically therewith, stationary guide means along which said member is vertically movable, and an indicator carried by said guide means at a fixed level at the immediate vicinity of said holding means, said holding means moving with respect to said indicator when movement is imparted to said member.

8. Apparatus for making a perspective drawing of an object comprising projection center structure providing primary and secondary projection centers which are spaced apart and in fixed relation with respect to one another, first movable structure mounted for universal movement about said primary projection center and projecting upwardly therefrom, means providing a first horizontal surface upon which plan view data of the object is adapted to be placed, said first movable structure including elongated contour following means having an end portion for following the contour of a plan view of the object on said first horizontal surface, such end portion being movable from and toward said primary projection center, second movable structure mounted for universal movement about said secondary projection center and projecting upwardly therefrom, means providing a second horizontal surface upon which the perspective drawing is adapted to be made, said second movable structure including elongated point marking means having an end portion adapted to produce a mark at said second horizontal surface, the end portion of said last-mentioned elongated point marking means being movable from and toward said secondary projection center, mechanical means for transmitting movement from a region of said first movable structure above said primary projection center to a region of said second movable structure above said secondary projection center, a plane parallel to said first horizontal surface and passing through said primary projection center also passing through said secondary projection center, said first and second movable structures being so angularly displaced with respect to one another that a plane passing through said contour following means and through the axis through both of said projection centers will be angularly displaced with respect to a plane passing through said point marking means and through the axis through both of said projection centers, and means for moving said first horizontal surface and said projection center structure relative to one another to vary the perpendicular distance between said first horizontal surface and the plane parallel thereto which passes through both of said projection centers.

9. Apparatus for making a perspective drawing of an object comprising projection center structure providing primary and secondary projection centers which are spaced apart and in fixed relation with respect to one another, first movable structure mounted for universal movement about said primary projection center and projecting upwardly therefrom, means providing a first horizontal surface upon which plan view data of the object is adapted to be placed, said first movable structure including contour following means adapted to be positioned at a multiplicity of points on the contour of a plan view of the object on said first horizontal surface, second movable structure mounted for universal movement about said secondary projection center and projecting upwardly therefrom, means providing a second horizontal surface upon which the perspective drawing is adapted to be made, said second movable structure including point marking means adapted to produce a mark at said second horizontal surface, mechanical means for transmitting movement from a region of said first movable structure above said primary projection center to a region of said second movable structure above said secondary projection center, a plane parallel to said first horizontal surface and passing through said primary projection center also passing through said secondary projection center, the parts of said first and second movable structures above said projection centers being so angularly displaced with respect to one another that a plane passing through said contour following means and through the axis through both of said projection centers will be angularly displaced with respect to a plane passing through said point marking means and through the axis through both of said projection centers, and means for moving said first horizontal surface and said projection center structure relative to one another to vary the perpendicular distance between said first horizontal surface and the plane parallel thereto which passes through both of said projection centers.

References Cited in the file of this patent

UNITED STATES PATENTS

| | | |
|---|---|---|
| 398,865 | Wade | Mar. 5, 1889 |
| 704,307 | Eichenberger | July 8, 1902 |
| 1,452,858 | Wetzer et al. | Apr. 24, 1923 |
| 1,617,632 | Gillespie | Feb. 15, 1927 |
| 2,419,610 | Waldorf | Apr. 29, 1947 |
| 2,615,251 | Edmunds | Oct. 28, 1952 |
| 2,746,152 | Deakin | May 22, 1956 |
| 2,766,528 | Waldorf | Oct. 16, 1956 |

FOREIGN PATENTS

| | | |
|---|---|---|
| 287,324 | France | Mar. 30, 1899 |
| 109,960 | Germany | Apr. 18, 1900 |
| 29,233 | Great Britain | 1911 |